(12) United States Patent
Clemenson

(10) Patent No.: US 6,337,025 B1
(45) Date of Patent: Jan. 8, 2002

(54) FILTER CANISTER FOR USE WITHIN A STORM WATER SEWER SYSTEM

(75) Inventor: Lyle J. Clemenson, Brooklyn Park, MN (US)

(73) Assignee: Environmental Filtration, Inc., Brooklyn Park, MN (US)

(*) Notice: Subject to any disclaimer, the term of this patent is extended or adjusted under 35 U.S.C. 154(b) by 0 days.

(21) Appl. No.: 09/513,144

(22) Filed: Feb. 25, 2000

Related U.S. Application Data

(63) Continuation-in-part of application No. 09/128,229, filed on Aug. 3, 1998, now Pat. No. 6,042,743.

(51) Int. Cl.[7] .............................................. C02F 7/00
(52) U.S. Cl. ................... 210/747; 210/163; 210/237; 210/170; 210/497.01
(58) Field of Search ................. 210/163, 170, 210/237, 497.01, 747; 43/100

(56) References Cited

U.S. PATENT DOCUMENTS

| | | | |
|---|---|---|---|
| 530,816 A | | 12/1894 | Wright |
| 1,686,415 A | | 12/1928 | Lyes |
| 2,182,795 A | | 12/1939 | Day |
| 2,263,259 A | | 11/1941 | Boosey |
| 2,516,658 A | * | 7/1950 | Stelly |
| 2,551,236 A | * | 5/1951 | Bergman |
| 2,615,526 A | | 10/1952 | Lane |
| 3,713,539 A | | 1/1973 | Thompson et al. |
| 3,800,464 A | * | 4/1974 | Parker |
| 3,815,748 A | | 6/1974 | Johannessen |
| 3,916,558 A | * | 11/1975 | Crouch |
| 4,347,134 A | * | 8/1982 | Svehaug |
| 4,419,232 A | | 12/1983 | Arntyr et al. |
| D273,883 S | * | 5/1984 | Sundberg |
| 4,486,122 A | | 12/1984 | Arntyr et al. |
| 4,659,251 A | | 4/1987 | Petter et al. |
| 5,000,217 A | | 3/1991 | Armanto |
| 5,028,320 A | | 7/1991 | Gaudin et al. |
| 5,069,781 A | | 12/1991 | Wilkes |
| 5,372,714 A | | 12/1994 | Logue, Jr. |
| 5,437,786 A | | 8/1995 | Horsley et al. |
| 5,575,925 A | | 11/1996 | Logue, Jr. |
| 5,613,319 A | * | 3/1997 | Botkins |
| 5,744,048 A | | 4/1998 | Stetler .................................. |

\* cited by examiner

Primary Examiner—Chester T. Barry
(74) Attorney, Agent, or Firm—Dicke, Billig & Czaja, P.A.

(57) ABSTRACT

A filter canister for use within a storm water sewer system. The filter canister includes a hollow retention body and a lower tapered filter. The retention body defines a top and a bottom, and is positionable within the storm water sewer system so as to direct fluid flow from the top to the bottom. The lower tapered filter defines a vertex end and a base. The lower tapered filter is attached to the bottom of the retention body such that the vertex end extends upwardly toward the top. In one preferred embodiment, a pelletized treatment media, such as peat-based, activated carbon-like pellets, is contained within the retention body. During use, the treatment media removes contaminants from water flow entering the filter canister. The lower tapered filter directs the removed contaminants toward an outer periphery such that the accumulated contaminants have minimal effect on a flow rate capacity of the filter canister.

22 Claims, 5 Drawing Sheets

FILTER CANISTER FOR USE WITHIN A STORM WATER SEWER SYSTEM

CROSS REFERENCE TO RELATED APPLICATIONS

This application is a continuation-in-part of U.S. application Ser. No. 09/128,229 entitled "Method of Processing Peat For Use In Contaminated Water Treatment," filed Aug. 3, 1998, now U.S. Pat. No. 6,042,743.

BACKGROUND OF THE INVENTION

The present invention relates to a filter for treating storm water. More particularly, it relates to a filter canister configured for use within a storm water sewer system.

Over the past several decades, the public awareness and concern regarding environmental issues has intensified greatly. To this end, a variety of local, state and federal pollution control agencies have been established to monitor the environment and enforce environmental regulations on individuals, businesses and municipalities. The broad scope of activities encompassed by these agencies illustrates the importance society has placed on controlling potential environmental hazards, including automobile emissions, landfills, industrial emissions, etc.

One extremely important environmental concern is contaminated or wastewater. Contaminated water is generated by many different sources. Regardless of the source, the contaminated water must be processed or "decontaminated" before allowed to flow into a natural water source, such as a pond, wetland, marsh, stream or river. For example, with industrial applications, wastewater generated by a particular manufacturing plant must, according to state and/or federal regulations, be treated to remove, or at least minimize, toxic or otherwise harmful substances prior to the wastewater being distributed into a city sewer system. Similarly, a city or town's sewage treatment facility must treat or decontaminate sewage. An additional, although sometimes overlooked, source of potentially toxic wastewater is storm runoff. More particularly, as rainwater drains from yards and driveways to the "storm water" sewer system, it accumulates a number of materials including grass clippings, fertilizer, pesticides, oil, metals, etc. Left untreated, these metallic, organic and other contaminants are allowed to flow through the storm sewer system to a nearby retention pond, where they can then contaminate the ground water supply and/or promote uncontrolled growth of bacteria or algae, etc., or directly into lakes, streams or rivers where similar problems can occur.

A number of different wastewater treatment methodologies have been developed in recent years. Invariably, the particular technique employed at any one location relates to the type of contaminants otherwise present in the wastewater produced by that location. One typical approach for treating contaminated wastewater is to direct the wastewater through a filtering system. In theory, the filtering system allows relatively "clean" water to flow through while preventing or stopping movement of the contaminant(s). For example, where the wastewater contains rocks, paper or other relatively large objects, the filtering system may include a screening. The screening "catches" the rocks, paper and other material, while allowing water to flow through. The contaminant material is later physically removed from the screen. Where, however, the contaminants in question are much smaller and/or dissolved into the wastewater, more sophisticated filtering techniques must be utilized.

The general goal behind alternative filtering techniques is to cycle the contaminated water through a filtering medium for which the particular contaminant(s) in question have an affinity. With this configuration, the contaminants attach themselves to the filtering medium, such that "clean" water exits the system. One example is treatment of aqueous solution (such as water) containing cationic metal contaminants. Treatment of a toxic cationic bearing aqueous solution is normally accomplished through the use of a filtering system incorporating an ion exchange resin or medium. Generally speaking, the ion exchange medium acts to adsorb toxic metal cations and/or other toxic cations. In other words, the toxic cations have an affinity for the ion exchange material, which acts to retain or remove the toxic material from the water or other aqueous solution. The ion exchange medium removes the toxic metal cations and replaces them with a more neutral material, such as sodium, oxygen or potassium.

A wide variety of materials are available for use as an ion exchange material. For example, research has been done on the effectiveness of processed peat. Peat is the product of the partial decay of saturated dead vegetation, and is relatively inexpensive. In order for peat to be useful as an ion exchange material, it normally must be sulfonated. This result is typically achieved by treating the peat with a strong sulfonating agent such as sulfuric acid. One example of such a process is described in U.S. Pat. No. 5,314,638 in which peat is first milled into particles less than 1 millimeter in diameter, then hydrolyzed, debituminized, and thereafter sulfonated. While the method described in U.S. Pat. No. 5,314,638 produces a sulfonated peat material with an improved ion exchange capability, the processing itself is quite expensive and produces only a small quantity of material during each processing cycle. Notwithstanding these potential deficiencies, sulfonated peat is undoubtedly useful as an ion exchange material.

Other common types of contaminants include organic materials, such as hydrocarbons, as well as phosphorous. Activated carbon has been found to be an effective medium for organic materials and phosphorous. While activated carbon can successfully remove undesirable materials from wastewater, activated carbon is quite expensive and requires processing to be useful as a filtering medium.

A variety of other specialized filtration mediums are available for treating contaminated water or other aqueous solutions. While these mediums may be highly effective in addressing certain treatment needs, they typically are quite expensive. Along these lines, there does not currently appear to be an inexpensive, integral medium capable of adsorbing toxic cations, organic materials, and phosphorous. Notably, the above-described rainwater or storm sewer runoff is but one example of an aqueous solution containing toxic cations, undesirable organic material, and especially phosphorous.

Perhaps due to the highly expensive nature of activated carbon and other applicable storm water treatment mediums, minimal efforts have been made to design a viable container for maintaining the treatment medium within a storm water sewer system. Regardless of the exact treatment material employed, the relatively harsh environment associated with a storm water sewer system places a number of constraints on the container not otherwise present in other filtration/treatment applications. For example, storm water entering the sewer system will often times includes a number of relatively large particles, such as grass clippings, that can block the entrance to the container. Additionally, contaminants removed from the storm water will accumulate within the container, potentially obstructing the container exit. Further, the volume and flow rate of water entering the storm sewer system (and thus the container) can vary greatly, especially during and following a heavy rainfall. It is quite possible that an increased volume and flow rate will exceed the capacity of the container/treatment media, possibly causing contaminated water to back-up within the container. Currently available treatment containers have not addressed these, and other constraints. For example, a flexible bag secured within the storm water sewer system below the sewer grate, while easy to install, will quickly become obstructed by the relatively large particles carried in the storm water. While other, more complex, devices are available, such as that described in U.S. Pat. No. 5,744,048 to Stetler, they are difficult to install and likely cost prohibitive.

Pollution control, and in particular treatment of contaminated water, continues to be an extremely important environmental concern. While various ion exchange and organic filtering materials are independently available to facilitate removal of toxic cations or organic contaminants from wastewater or other aqueous solutions, the costs associated with these materials are prohibitive. Further, there currently does not exist a storm water sewer system treatment container able to perform under the rigorous conditions presented by the sewer system on a cost effective basis. Therefore, a need exists for an inexpensive, filter canister for use within a storm water sewer system.

SUMMARY OF THE INVENTION

One aspect of the present invention provides a filter canister for use within a storm water sewer system. The filter canister includes a hollow retention body and a lower tapered filter. The retention body defines a top and a bottom and is positionable within a storm water sewer system to direct fluid flow from the top to the bottom. The lower tapered filter defines a vertex end and a base. The lower tapered filter is attached to the bottom of the retention body such that the vertex end extends upwardly toward the top. In one preferred embodiment, the filter canister contains a pelletized treatment medium, such as a peat-based product having activated carbon-like characteristics. In another preferred embodiment, the filter canister includes an upper tapered filter selectively secured to the top of the retention body such that a vertex of the upper tapered filter extends downwardly toward the bottom. Regardless, during use, the tapered shape and orientation of the lower tapered filter collects and directs various contaminants and other particles to location(s) that minimize any reduction in the volumetric flow through capacity of the filter canister.

Another aspect of the present invention provides a method of filtering effluent flowing into a storm water sewer system. The method includes providing a filter canister including a hollow retention body, a lower tapered filter, and a pelletized adsorbent media. The retention body defines a top and a bottom. The lower tapered filter is secured to the bottom of the retention body such that a vertex of the lower tapered filter extends upwardly toward the top. The pelletized adsorbent media is contained within the retention body. The filter canister is positioned within the storm water sewer system such that effluent entering the storm water sewer system flows into the top of the retention body. The effluent is directed through the retention body and into contact with the pelletized adsorbent media for removing contaminants from the effluent. The contaminants are guided to an outer periphery of the lowered tapered filter such that the contaminants minimally inhibit a flow rate of the effluent through the bottom of the retention body.

DETAILED DESCRIPTION OF THE INVENTION

Figure 1:
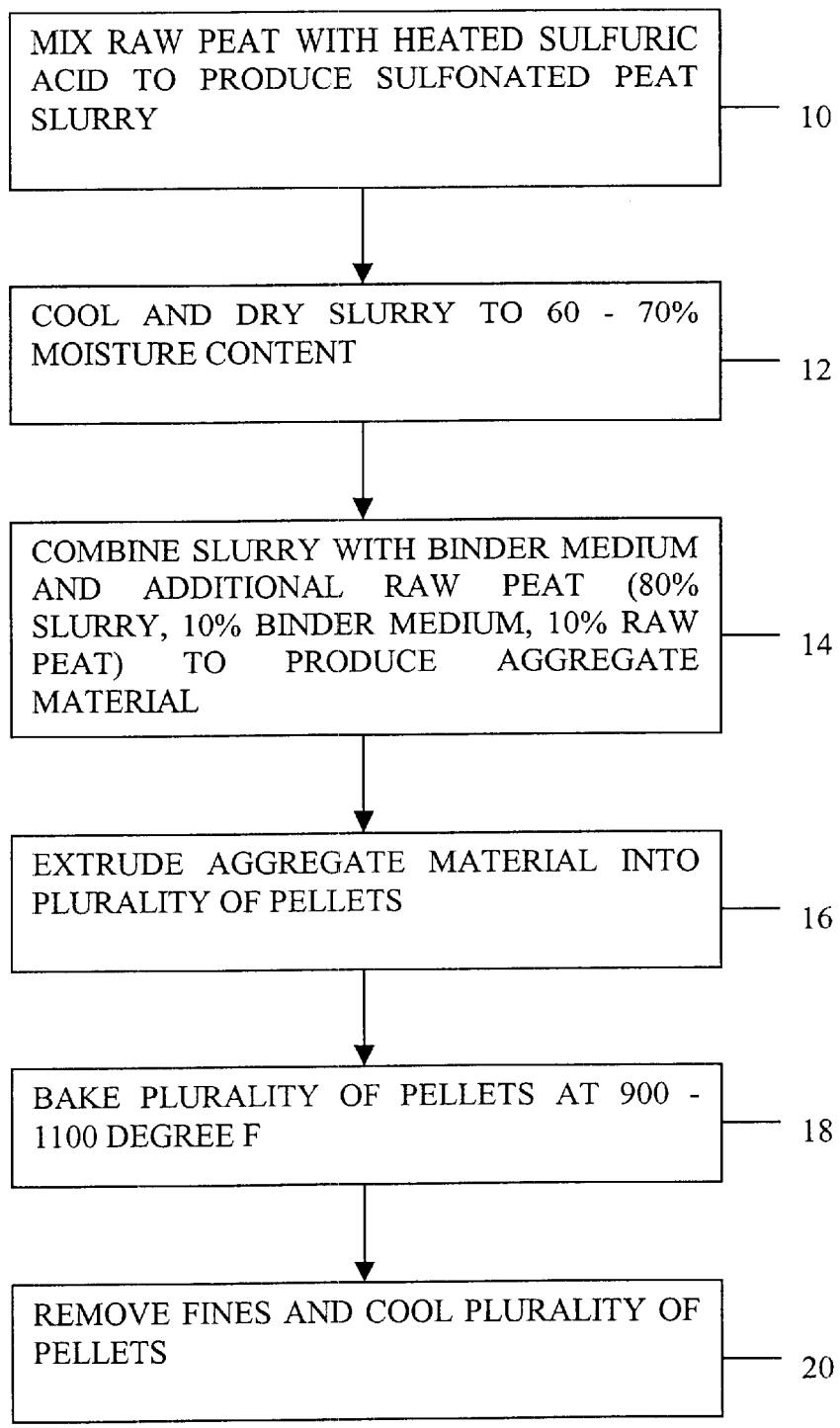
FIG. 1 is a flow diagram of a method of processing peat for use as a contaminated water treatment material in accordance with the present invention.

FIG. 1 provides a step-by-step explanation of a method of processing peat for use as a contaminated water treatment material in accordance with a preferred embodiment of the present invention. For purposes of this specification, the term "contaminated water" is used broadly to include an aqueous solution within which undesirable materials, including metals, organics and phosphorous, are maintained.

As a starting point, peat is a widely available material, a product of the partial decay of saturated dead vegetation. Different varieties of peat are known, for example, being derived from sphagnum moss, reed-sedge moss and humus moss to name but a few. Due to the virtually limitless quantity of naturally occurring peat, peat is an inexpensive compound.

With the above understanding of the term "peat" in mind, a method in accordance with the present invention begins at step 10 by mixing raw peat with a sulfonating agent, preferably sulfuric acid. For example, in one preferred embodiment, a quantity of peat and a volume of diluted sulfuric acid are placed in a large vat. With this example, the sulfuric acid solution has a concentration of less than approximately 20% to minimize potential handling dangers. It should be understood that the sulfuric acid solution may be more or less concentrated, up to 100% concentration. With reference to the preferred 20% sulfuric acid concentration, a peat-to-sulfuric acid ratio of 1–2 pounds peat per 1 gallon of 20% sulfuric acid (0.45–9.0 kg peat: 3.785 liter 20% $H_2SO_4$) has been identified as being preferred. Thus, in one example, 72 pounds (33 kg) of raw peat is placed in a large vat and mixed with 45 gallons (170 liter) of 20% sulfuric acid. Prior to placing the peat into contact with the sulfuric acid, the sulfuric acid is preferably heated to boiling in the temperature in the range of approximately 200–215 degree F. (93–102 degree C.). Alternatively, the sulfuric acid bath may be heated to boiling during the mixing process.

The above-described mixing process continues until a relatively uniform slurry is generated. In this state, the sulfonated peat is fluid-like. Notably, other techniques for sulfonating the peat are available, including the soxlet method described in U.S. Pat. No. 5,314,638. Regardless of the method chosen, a sulfonated peat slurry is provided for further processing. As previously described, sulfonated peat is a weak acid, able to attract cations.

The sulfonated peat slurry is then cooled and partially dried at step 12. For example, the heat source associated with the vat may be removed and the vat left uncovered. Assuming the vat is otherwise exposed to room temperature, the exposed sulfonated peat slurry cools and dries. Under these conditions, the cooling and drying process continues for approximately 1–2 hours. Alternatively, the sulfonated peat slurry may be placed into a cool air dryer so as to expedite the cooling and drying process. Regardless of the exact processing technique, the sulfonated peat slurry is cooled to a temperature below approximately 140 degree F. (60 degree C.) and dried to a moisture content in the range of approximately 60–70%. In this regard, the key parameter is the moisture content, which is preferably determined through use of a computer-controlled moisture probe. As described in greater detail below, the preferred 60–70% moisture content facilitates subsequent mixing of the slurry with additional components, as well as extrusion processing. Notably, the preferred temperature of less than 140 degree F. (60 degree C.) is selected solely for handling purposes. By reducing the temperature of the slurry below 140 degree F. (60 degrees C.), operators are able to perform subsequent processing steps with minimal concern for burning or skin irritation. However, the method of the present invention will perform equally as well at higher temperatures.

At step 14, the sulfonated peat slurry is combined with a binder medium. In one preferred embodiment, the binder medium is a colloidal clay material, preferably bentonite. Bentonite is an inexpensive, colloidal clay composed primarily of dioctehedral smetite. Alternatively, the binder medium is a cellulose-based material. A number of commercially available cellulose-based materials, such as hydroxy ethyl cellulose, able to thicken water-based products can be used. The bentonite or other binder medium serves to coagulate the sulfonated peat slurry into a soft, malleable, aggregate material. To assist in this coagulation process, an additional quantity of raw peat may be added to the sulfonated peat slurry. Thus, in one preferred embodiment, the aggregate material is generally comprised of approximately 70–90% of the sulfonated peat slurry, approximately 5–15% bentonite and approximately 5–15% raw peat. In a more preferred embodiment, the aggregate material is 80% of the sulfonated peat slurry, 10% bentonite and 10% raw peat. Notably, other percentages are acceptable and are likely dependent upon the particular binder medium employed. The constituents are mixed for a sufficient length of time until a relatively consistent, soft, aggregate material results.

At step 16, the aggregate material is extruded into a plurality of small pellets or balls. In one preferred embodiment, a conveyorized industrial extrusion machine is provided. However, other well-known extrusion techniques are equally acceptable. Even further, the aggregate material can be formed into the plurality of pellets by a method other than extrusion. The plurality of pellets need not be uniformly shaped, but preferably have a diameter in the range of approximately 0.1–1.0 inch, more preferably 0.5–0.625 inch. The previously described combination of the sulfonated peat slurry with a binder medium encourages the extrusion process such that each of the plurality of pellets readily maintain their extruded shape.

The plurality of pellets are then baked in an oven at a temperature in the range of 800–1200 degree F. (427–649 degree C.); more preferably in the range of approximately 900–1100 degree F. (480–594 degree C.) at step 18. In one preferred embodiment, the pellets are baked for approximately 15–30 minutes, more preferably 20 minutes. In a further preferred embodiment, the oven provides a low oxygen environment to the pellets during baking, preferably less than 2% oxygen. Baking the pellets at this extremely high temperature and reduced oxygen environment has the effect of essentially "carbonizing" a portion of the pellet material. Thus, the baking process dries and chars an outer surface of each of the plurality of pellets. As a result, each of the plurality of pellets has an appearance similar to activated carbon and in fact possess an organic-retention property highly similar to that found with activated carbon. Thus, the charred portion of each of the plurality of pellets is able to retain or adsorb phosphorous particles otherwise present in a contaminated aqueous solution.

In one preferred embodiment, the oven is conveyorized. The conveyor associated with the oven has an adjustable speed such that a large quantity of pellets can be continuously processed during the requisite 15–30 minute bake time. Finally, it will be apparent to one of ordinary skill in the art that other temperatures and associated bake times may be used to effectuate the partial "carbonization" of the plurality of pellets.

Finally, at step 20, any undersized particles (or fines) removed and the plurality of pellets cooled. The excess particles or fines are formed by random breakage of an individual pellet and can be removed by a simple mechanical screening process. Although the particulate material can function as an organic absorbent or sorbent, due to its small size, it may be difficult to maintain the particulate within a perforated canister, an example of which is described in greater detail below. The final cooling process may be facilitated by placing the plurality of pellets into a container of water, or the pellets may be allowed to simply cool at room temperature.

The above-described processing technique modifies raw peat into a material having both ion exchange and organic particle retention attributes. In other words, because the peat has been sulfonated, it will adsorb cationic materials, such as toxic metals. Additionally, by subjecting the sulfonated peat-based pellets to intense heat, the material assumes an activated carbon-like feature as well. The resulting material will attract and retain organic materials, as well as other contaminants, especially phosphorous. Finally, via inclusion of a binder material, formation of the peat into a plurality of relatively uniform pellets or balls augments the applicability of the resulted material in a high volume, flow through wastewater treatment system.

A variety of primary tests have been performed to evaluate the filtering capabilities of peat processed in accordance with the present invention. These tests were performed both in laboratory settings as well as at actual contaminated water sites.

For example, a gravity drop test was performed under laboratory settings in which 5 pounds (2.3 kg) of peat pellets, fabricated in accordance with the previously described method, were placed in a 4 inch (10 cm) diameter PVC tubing. A number of different samples were initially analyzed, passed through the pellets and then reanalyzed. In a first experiment, pond water was tested and the following results obtained:

| Metal | Content Before Processing (mg/l) | Content After Processing (mg/l) | Reduction (%) |
|---|---|---|---|
| Pb | 1.69 | 0.02 | 98.8 |
| Zn | 6.87 | 5.76 | 16.2 |
| Cu | 9.91 | 0.03 | 99.6 |
| Cr | 0.60 | 0.02 | 96.6 |

A similar test was performed with an oil/water sample. The results obtained were as follows:

| Metal | Content Before Processing (mg/l) | Content After Processing (mg/l) | Reduction (%) |
|---|---|---|---|
| Pb | 5.15 | 1.16 | 77.5 |
| Zn | 18.70 | 7.28 | 61.1 |
| Cu | 9.8 | 2.15 | 78.1 |
| Cr | 0.26 | 0.08 | 69.2 |

In addition to analyzing for various metals in the oil/water sample, a variety of hydrocarbons were also examined. The following results were achieved:

| Hydrocarbon | Content Before Processing (:g/l) | Content After Processing (:g/l) | Reduction (%) |
|---|---|---|---|
| Trichloroethene | 31381.6 | 8118.4 | 74.1 |
| Toluene | 13026.3 | 3036.5 | 76.7 |
| Ethyl Benzene | 14650.3 | 1842.4 | 87.4 |
| m&p-xylenes | 58723.5 | 10574.0 | 81.9 |
| o-xylenes | 21304.7 | 2356.9 | 88.9 |

As expected, the sulfonated peat processed in accordance with the present invention functioned as an ion exchange material, reducing the amount of metal cations present in a particular aqueous solution. Further, a wide variety of organic hydrocarbons were also removed due to the aforementioned "carbonization". In addition, a contaminant material typically associated with rain water flowing through a storm water sewer system is phosphorous. Phosphorous imposes distinct environmental concerns for rain water storm drainage systems in that phosphorous greatly accelerates the undesirable growth of algae in an associated retention pond or basin. In this regard, a series of samples were taken from different retention ponds and processed through the above-described laboratory gravity drop test. Following results were observed:

| Sample No. | Phosphorous Content Before Processing (mg/l) | Phosphorous Content After Processing (mg/l) | Reduction (%) |
|---|---|---|---|
| 1 | 0.26 | 0.18 | 30.7 |
| 2 | 0.37 | 0.26 | 29.7 |
| 3 | 39.0 | 0.57 | 98.5 |
| 4 | 0.29 | 0.05 | 82.8 |
| 5 | 0.59 | 0.39 | 33.8 |

Finally, a series of on-site tests were performed. In this regard, a large filter canister containing a quantity (approximately 150 pounds (68 kg)) of sulfonated peat pellets manufactured in accordance with the present invention were placed in storm water sewer systems, directly beneath an associated inlet grate. At each site, rain water passed through the grate directly into the pellet-containing canister. After passing through, and therefore being processed by, the pellets, the rain water exited from an opening in the bottom of the canister and was allowed to flow through the remainder of the storm water sewer system. A sample was taken above and below (or upstream and downstream) the canister. The above-described configuration was placed at three separate locations and the following results were obtained:

| Sample No. | Phosphorous Content Upstream (mg/l) | Phosphorous Content Downstream (mg/l) | Reduction (%) |
|---|---|---|---|
| 1 | 0.68 | 0.20 | 70.5 |
| 2 | 0.48 | 0.06 | 87.5 |
| 3 | 1.30 | 0.30 | 76.9 |

As evidenced by the above experiments, peat processed in accordance with the present invention serves as both an ion exchange medium and additionally removes organic materials and phosphorous. The unique processing technique described herein provides a sulfonated peat pellet having activated carbon-like organic binding characteristics on a cost-effective basis. In fact, peat material processed in accordance with the present invention may be useful as an alternate for activated carbon in certain filtering situations and on a per pound cost being substantially less than that of activated carbon.

Figure 2:
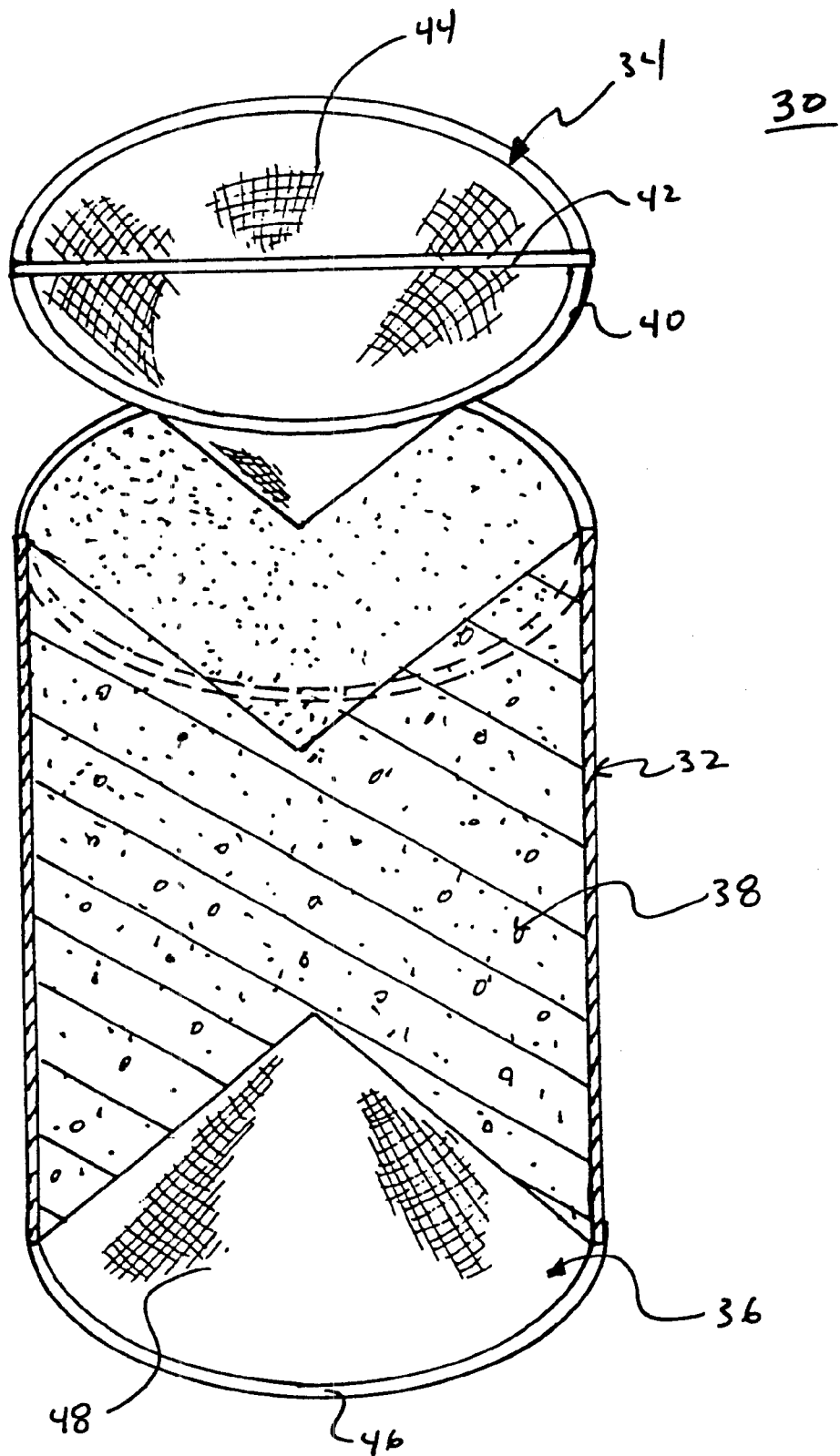
FIG. 2 is a side perspective view of a filter canister for maintaining peat pellets processed in accordance with the present invention.

As described above, several on-site tests were performed by installing a pelletized peat-containing filter canister within a storm water sewer system. One preferred embodiment of a filter canister 30 is shown in FIG. 2. The canister 30 includes a hollow retention body, preferably a cylinder, 32, an upper conical or tapered filter 34 and a lower porous cone or tapered filter 36. The upper tapered filter 34 and the lower tapered filter 36 are mounted to the retention body 32 to define an enclosure for maintaining a plurality of peat-based pellets 38 prepared in accordance with the method of the present invention. Alternatively, the filter canister 30 may contain treatment medias other than peat-based that may or may not be pelletized.

The retention body 32 is preferably an integrally formed body made of a strong, lightweight material. In one preferred embodiment, the retention body 32 is made from stainless steel, although other metals such as aluminum or sheet metal may also be useful. Even further, a hardened plastic such as polyvinyl chloride (PVC), high density polyethylene (HDPE) or any other polyolefin may be used. The retention body 32 is sized in accordance with the size of a particular storm sewer catch basin, defining an outer dimension approximating an interior size of a catch basin, as described below. Thus, in one preferred embodiment, the retention body 32 is sized to have a volume of 30 gallons (114 liters), although any other volume, larger or smaller, may be used. While the retention body 32 is depicted as preferably being cylindrical, other shapes are equally acceptable. For example, the retention body 32 may be triangular, square, rectangular, etc., in cross-section. Even further, the retention body 32 may assume an irregular shape.

The upper tapered filter 34 preferably includes a frame 40 defining a base 41 and a vertex end 42, a handle 43 and filter material 44. The handle 42 and the filter material 44 are attached to the frame 40, which otherwise defines a preferred conical shape. Alternatively, the upper tapered filter 34 can assume other tapered shapes, again preferably defined by the frame 40.

The frame 40 is preferably made of a rigid material, such as stainless steel, and forms a cone. The frame 40 is sized to provide a frictional fit with the retention body 32. Thus, in accordance with one preferred embodiment where the retention body 32 is a cylinder, the frame 40 has a diameter approximating that of the cylinder 32. Alternatively, the retention body 32 may include a flange or similar structure for receiving and maintaining the frame 40. The handle 42 is also made of a material similar to that of the frame 40 such that the handle 43 is attached at opposite ends to the frame 40, such as by welds. In this regard, the handle 43 is configured to provide a convenient surface for a user (not shown) to grasp and maneuver the upper tapered filter 34. Thus, the handle 43 may assume a wide variety of forms, or may be eliminated entirely.

The filter material 44 is preferably a fabric material defining a plurality of small openings. In one preferred embodiment, the filter material 44 is polymer-based, such as polyester or polypropylene. Other polymeric fabric material may also be useful. Even further, a metal screening may be employed. Regardless of the exact material selected, the filter material 44 must be relatively rigid, able to maintain its integrity under high load stresses. Further, the filter material 44 preferably will not degrade when exposed to sunlight for prolonged periods. The filter material 44 is secured to the frame 40, thereby adhering to the tapered, preferably conical, shape defined by the frame 40. With this construction, the frame 40 supports the filter material 44 when subjected to a load.

The lower tapered filter 36 includes a frame 46, defining a base 47 and a vertex end 48, and a filter material 49. Similar to the frame 40 of the upper tapered filter 40, the frame 46 of the lower tapered filter 36 is preferably made of metal, forming a cone sized in accordance with the retention body 32. Thus, in accordance with one preferred embodiment where the retention body 32 is a cylinder, the frame 46 is sized to have a diameter approximating a diameter of the cylinder 32. The filter material 48 defines a plurality of openings, each having diameter less than a diameter of each of the plurality of pellets 38. Thus, the filter material 49 is able to retain the plurality of pellets 38, along with other particulates, such as sand or other sediments, within the retention body 32. The filter material 49 is preferably a metal screen able to maintain its integrity under high loads, but may alternatively be a fabric-type material. Regardless, the filter material 49 is secured to the frame 36, thereby adhering to the preferred conical shape of the frame 46.

The filter canister 30 is assembled by first securing the lower tapered filter 36 to a bottom of the retention body 32. In a preferred embodiment, the base 47 is secured to the bottom of the retention body 32. For example, the frame 46 is welded to the retention body 32, although other mounting techniques may also be useful. As shown in FIG. 2, the lower tapered filter 36 is assembled to the retention body 32 such that the vertex end 48 extends upwardly within the retention body 32 toward a top of the retention body 32 (relative to the orientation of FIG. 2).

The upper tapered filter 34 is configured to be selectively secured to a top of the cylinder 32. As described in greater detail below, the pelletized treatment media 38 is preferably placed into the retention body 32 prior to attachment of the upper tapered filter 34. Regardless, a user (not shown) may then attach the upper tapered filter 34 to the top of the retention body 32 by simply grasping the handle 43 and positioning the upper conical filter over (and within) the retention 32 as shown in FIG. 2. More particularly, the upper tapered filter 34 is positioned such that the base 41 is generally aligned with the top of the retention body 32 and the vertex end 42 extends into the retention body 32. In other words, the upper tapered filter 34, and in particular the vertex end 42, extends downwardly (relative to the orientation of FIG. 2) from the top of the retention body 32.

Figure 3:
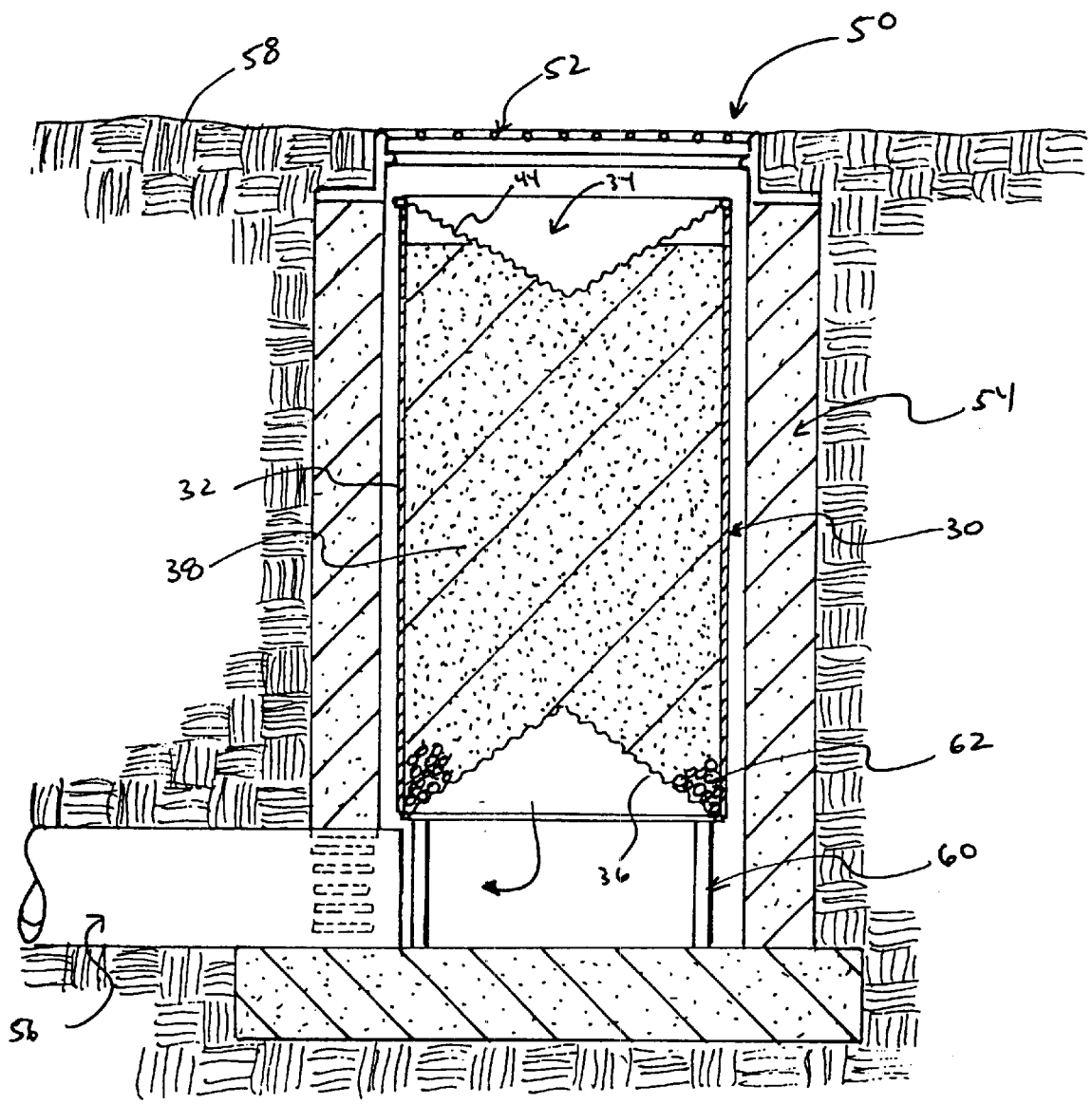
FIG. 3 is a side sectional view of the filter canister of FIG. 2 installed within a storm water sewer system.

During use, the filter canister 30 is placed within a storm water sewer system 50 as shown in FIG. 3. The storm water sewer system 50 typically includes a number drainage assemblies, each of which has an inlet grate 52, a concrete catch basin barrel 54 and a sewer pipe 56. The inlet grate 52 is positioned approximately at ground level 58, whereas the concrete catch basin barrel 54 and the sewer pipe 56 are below the ground level 58. The concrete catch basin barrel 54 utilized for different drainage systems normally have a "standard" diameter, but may vary in depth. Generally speaking, storm water runoff enters the storm sewer system 50 via the inlet grate 52 and is directed through the concrete catch basin barrel 54 into the sewer pipe 56. The sewer pipe 56 then guides the storm water runoff to a retention pond (not shown) that receives storm water runoff from a number of other drainage assemblies.

The filter canister 30 is preferably loaded with the pelletized treatment media 38 before being placed into the concrete catch basin barrel 54, although because the upper tapered filter 34 can easily be removed from the retention body 32, the pelletized treatment media 38 can be loaded into the retention body 32 after placement in the concrete catch basin barrel 54. To this end, the concrete catch basin barrel 54 has a relatively uniform diameter such that the filter canister 30, and in particular the retention body 32, has a diameter approximating the diameter of the concrete catch basin barrel 54 and preferably has a "standard" size of approximately 30 gallons (114 liter). With this preferred volume in mind, in accordance with one preferred embodiment where the pelletized treatment media 38 is a peat-based, activated carbon-like material, approximately 150 pounds (68 kg) of the pellets 38 are placed into the filter canister 30.

Regardless of when the pelletized treatment media 38 are placed within the filter canister 30, the upper tapered filter 34 is secured to the retention body 32. In a preferred embodiment, the filter canister 30 is positioned within the concrete catch basin barrel 54 such that the upper tapered filter 34 (and thus a top of the filter canister 30) is adjacent the inlet grate 52. So that water can discharge from the lower tapered filter 36, a riser 60 is normally provided. The riser 60 supports the filter canister 30 within the concrete catch basin barrel 54 such that the lower tapered filter 36 is above the sewer pipe 56. In this regard, the riser 60 preferably includes a series of space columns otherwise configured to allow water to flow from the filter canister 30 to the sewer pipe 56. Alternatively, the riser 60 may be a perforated tube configured to support the filter canister 30 while allowing water flow to the sewer pipe 56. Further, the riser 60 is preferably sized to position the top of the filter canister 30 just below the inlet grate 52.

During use, storm water runoff enters the storm sewer system 50 at the inlet grate 52 and is directed by gravity to the upper tapered filter 34. To this end, an additional funnel (not shown) may be provided to assist in directing storm water runoff to the upper tapered filter 34. The filter material 44 of the upper tapered filter 34 acts as a mechanical filter, capturing relatively large contaminants such as grass clippings, sediment, etc. Due to the shape and orientation of the upper tapered filter 34, these captured particles will accumulate centrally within the upper tapered filter 34 (at the vertex end 42) such that the total volume flow capacity of the filter canister 30 is only minimally affected.

The storm water runoff then flows, via gravity, into the retention body 32 where it is treated by the pelletized treatment media 38. As described elsewhere, the pelletized treatment media 38 is preferably processed so as to attract and retain toxic metal cations, as well as undesirable organic materials and phosphorous.

The treated storm water runoff then flows, via gravity, to the lower tapered filter 36. Once again, the filter material 49 of the lower tapered filter 36 acts as a mechanical screen, capturing relatively large contaminants not otherwise captured by the upper tapered filter 34. Further, the lower tapered filter 36 traps and retains contaminants, sediment and other particles 62 removed from the storm water runoff by the pelletized treatment media 38. To this end, the unique shape and orientation of the lower tapered filter 36 minimizes the affect the particles 62 would otherwise have on the volumetric flow through capacity of the filter canister 30. As shown in FIG. 3, the upright, conical shape of the lower tapered filter 36 directs the particles 62 to a position along an outer periphery of the lower tapered filter 36 (at the base 47). Further, due to the tapered shape of the lower tapered filter 36, an increased surface area is provided to maximize the amount of fluid flow from the filter canister 30. If, for example, the lower tapered filter 36 had a flat construction, the particles 62 would accumulate over the entire internal surface of the lower tapered filter 36, thereby greatly impeding fluid flow.

The treated storm water runoff then exits the filter canister 30 via the lower tapered filter 36. The riser 60, as previously described, is configured to allow the treated storm water to then flow to the sewer pipe 56, which then directs the storm water runoff to a retention pond (not shown) or other storm water runoff retention site.

Over time, a large quantity of sediment, grass clippings, etc. may accumulate in the upper tapered filter 34. It may, therefore, be necessary to remove these materials from the upper tapered filter 34. At regular time intervals, for example every 3–6 months, a user (not shown) removes the inlet grate 52 and grasps the upper tapered filter 34 at the handle 43. The upper tapered filter 34 is then removed from the sewer system 50 and the accumulated material disposed of.

Figure 4:
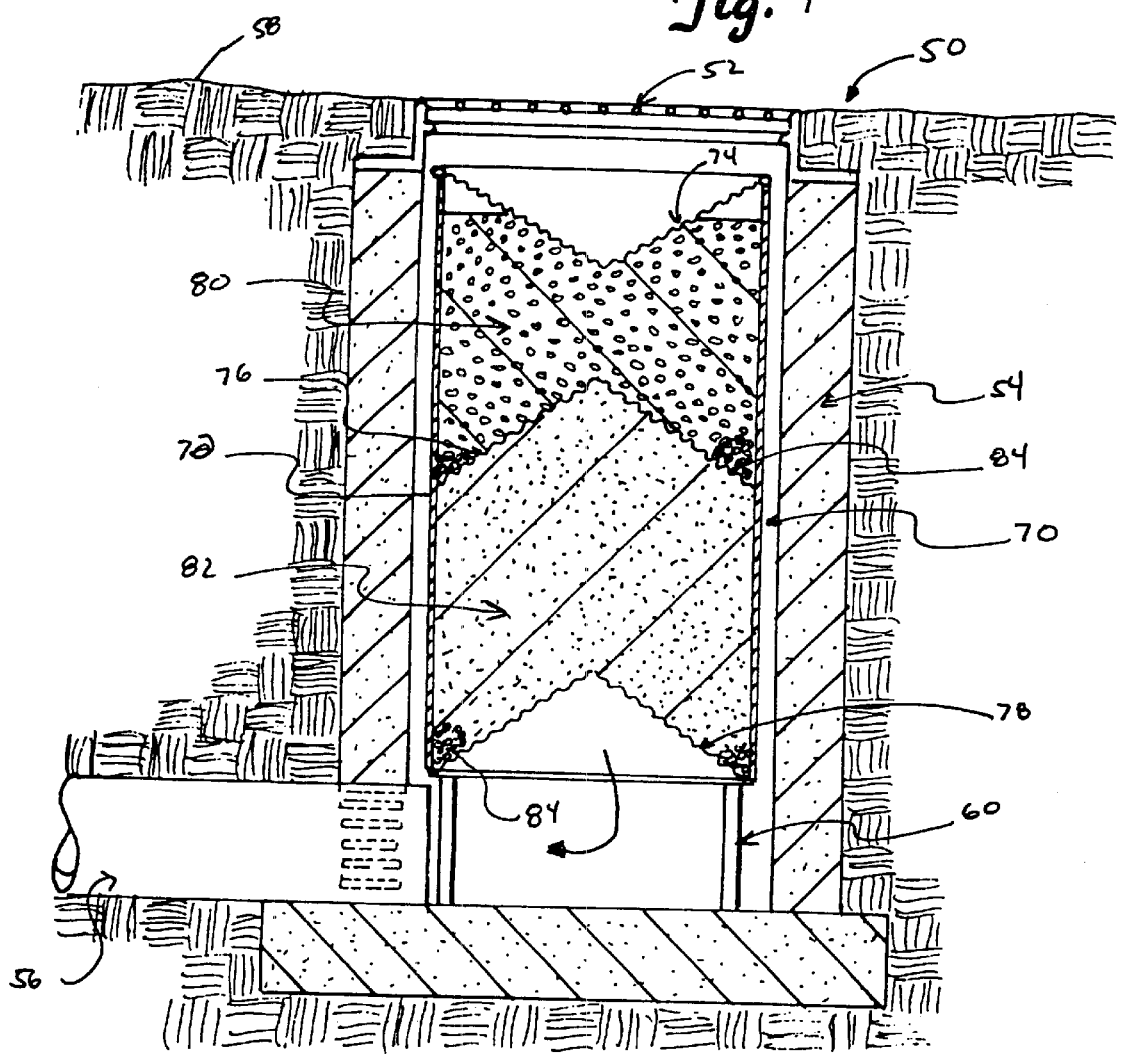
FIG. 4 is a side sectional view of an alternative filter canister installed within a storm water sewer system.

An alternative embodiment of a filter canister 70 disposed within the sewer system 50 is shown in FIG. 4. The filter canister 70 includes a hollow retention body 72, an upper tapered filter 74, an intermediate tapered filter or porous cone 76 and a lower tapered filter 78. A first treatment medium 80 (such as a pelletized treatment media) is maintained between the intermediate tapered filter 76 and the upper tapered filter 74. Further, a second treatment medium 82 (such as a pelletized treatment media) is maintained between the lower tapered filter 78 and the intermediate tapered filter 76.

The filter canister 70 is highly similar in construction and performance to the filter canister 30 previously described, except for the addition of the intermediate tapered filter 76. Thus, the lower tapered filter 78 is permanently secured to a bottom of the retention body 72, whereas the upper tapered filter 74 is preferably configured to be selectively secured to a top of the retention body 72. The intermediate tapered filter 76 is, in one preferred embodiment, selectively secured within the retention body 72. For example, the retention body 72 may include an internal flange (not shown) sized to frictionally maintain the intermediate tapered filter 76, although other forms of attachment may be employed.

By including the intermediate tapered filter 76, two different types of treatment mediums 80, 82 may be maintained within the filter canister 70. In this regard, the first treatment medium 80 may be designed to remove a first type of contaminant from storm water runoff, while the second treatment medium 82 is manufactured to retain a second type of contaminant.

Assembly of the filter canister 70 is highly similar to that previously described. For example, once the lower tapered filter 78 has been secured to a bottom of the retention body 72 (with its vertex extending upwardly into the cylinder 72), the second treatment medium 82 is disposed into the retention body 72. As shown in FIG. 4, the quantity of the second treatment medium 82 fills approximately one-half of the available volume of the retention body 72. The intermediate tapered filter 76 is then secured within the retention body 72 such that its vertex extends upwardly relative to the orientation of FIG. 4. The first treatment medium 80 is then placed into the retention body 72, on top of the intermediate tapered filter 76. Finally, the upper tapered filter 74 is secured to a top of the retention body 72 (with its vertex extending downwardly into the retention body 72). To facilitate fluid flow to the sewer pipe 56, the filter canister 70 is placed on top of the riser 60.

During use, the storm water runoff flows, via gravity, from the inlet grate 52 into the filter canister 70. The upper tapered filter 74 acts as a mechanical catch, trapping relatively large particles such as grass clippings, etc. The storm water runoff flows through, and is treated by, the first treatment medium 80 and the second treatment medium 82. The intermediate tapered filter 76 and the lower tapered filter 78 collect accumulated contaminants, sediment and other particles 84 along respective outer peripheries, as shown in FIG. 4. To this end, the shape and orientation of the intermediate tapered filter 76 and the lower tapered filter 78 provide an enlarged surface area to minimize the reduction, if any, on the flow through capacity of the filter canister 70.

As should be evidenced by the above discussion, the filter canister 30 (FIG. 2) or 70 can be constructed to have a number of intermediate tapered filters, and therefore treatment mediums. An important feature, however, is the tapered, preferably conical, shape of the respective tapered filters, along with an orientation whereby each of the tapered filters (other than the upper tapered filter) is upright such that the vertex of each conical filter extends toward a top of the retention body.

Figure 5:
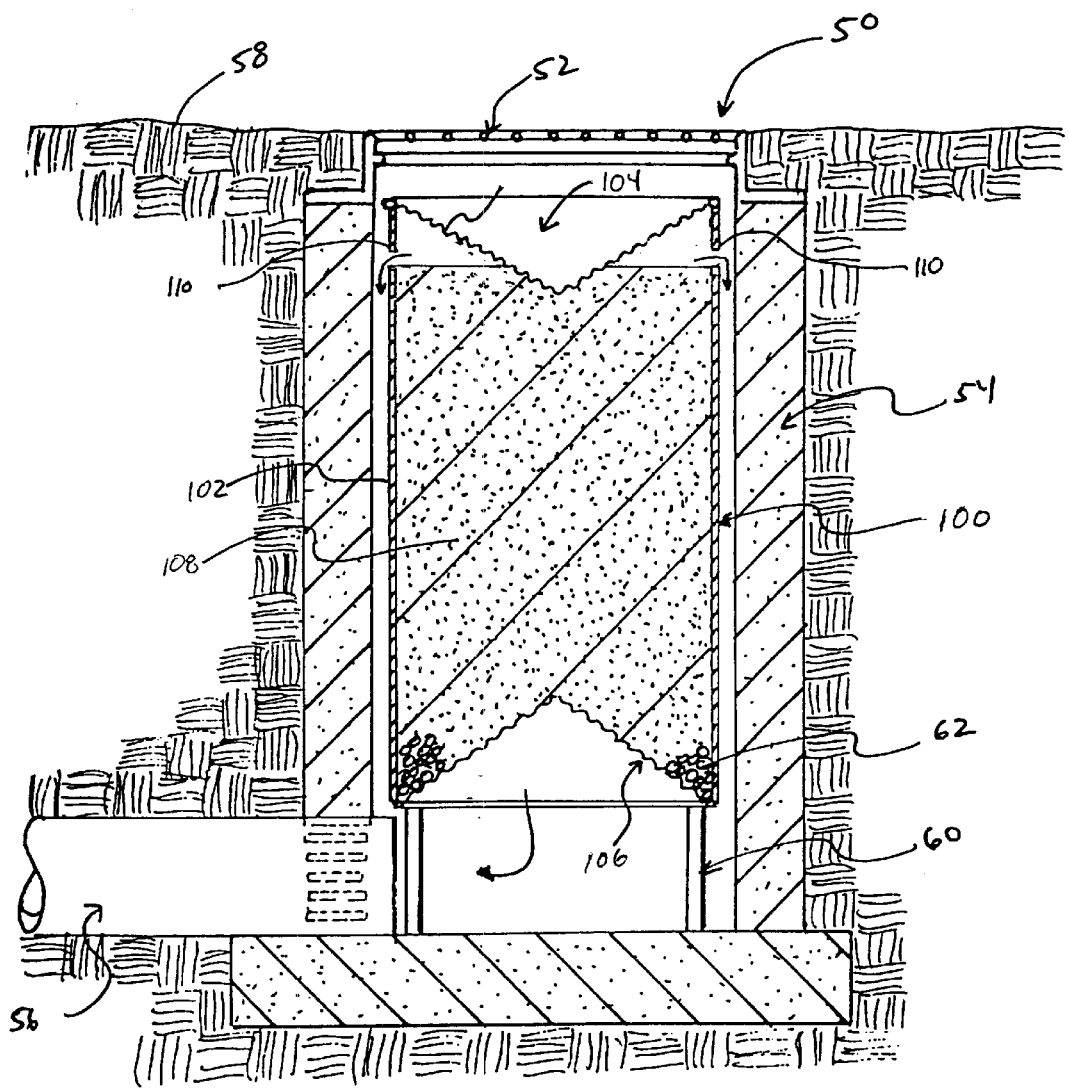
FIG. 5 is a side sectional view of an alternative filter canister installed within a storm water sewer system.

Yet another alternative embodiment of a filter canister 100 is shown in FIG. 5. The filter canister 100 is highly similar to the filter canister 30 (FIG. 2) previously described and includes a retention body 102, an upper tapered filter 104, a lower tapered filter 106 and a pelletized treatment media 108. In addition, the retention body 102 of the filter canister 100 forms a plurality of orifices 110 adjacent a top thereof. The orifices 110 are sized to allow overflow water to flow from the retention body 102 as described below. In one preferred embodiment, each of the plurality of orifices has a diameter of approximately 2 inches, and are uniformly spaced along an outer periphery (preferably circumference) of the retention body 32. Alternatively, other diameters and spacings are equally acceptable.

Inclusion of the orifices 110 promotes a desired release or overflow of water from the retention body 102 during periods increased water runoff. For example, under normal storm water sewer system 50 conditions, an average to above average rain fall results in water entering the inlet grate 52 (and thus the filter canister 100) at a flow rate of 0.75 cubic feet per second (cfs). Under these conditions, and with a preferred embodiment of the filter canister 100 including the retention body 102 having a volume of 30 gallons maintaining 150 pounds of peat-based, activated carbon-like pellets 108, the water will enter, flow through (being treated by the pellets 108), and exit the retention body 102 without "filling" the entire volume of the retention body 102. That is to say, a level of the water within the filter canister 100 will never rise to, or above, a top of the retention body 102 at flow rates of less than 0.75 cfs.

However, periodically, a heavy rainfall may occur, resulting in a water flow rate (at the inlet grate 52 and the filter canister 100) in excess of 0.75 cfs, (on the order of 3 cfs). Under these conditions, and again with reference to the described preferred embodiment, the water level within the filter canister 100 will rise to the top of the retention body 102 due to the compact nature of the pellets 108. Without the orifices 110, the water level would continue to rise to a top of the upper tapered filter 104, thereby preventing additional water from entering the upper tapered filter 104. As previously described, the upper tapered filter 104 removes relatively large particles (e.g., grass clipping, leaves, garbage, etc.). Inclusion of the orifices 110 allows the gross filtration provided by the upper tapered filter 104 to continue during periods of increased water flow. More particularly, the water will overflow from the retention body 102 via the orifices 110, such that the water level does not rise to the upper tapered filter 104. Thus, water entering the storm water sewer system 50 will continue to interact with the upper tapered filter 104, with large particles being removed. To assist in preventing release of removed contaminants and/or pellets 108 through the orifices 110, a screen material can be placed across each of the orifices 110.

Although the present invention has been described with reference to preferred embodiments, workers skilled in the art will recognize that changes may be made in form and detail without departing from the spirit and scope of the invention.

What is claimed:

1. A filter canister for use within a storm water sewer system, the filter canister comprising:
   a hollow retention body defining a top and a bottom, the retention body being positionable within a storm water sewer system to direct fluid flow from the top to the bottom; and
   a lower tapered filter defining a vertex end and a base, the lower tapered filter being attached to the bottom of the retention body such that the vertex end extends upwardly toward the top; and
   a water decontamination material contained within the retention body.

2. The filter canister of claim 1, wherein the retention body is cylindrical.

3. The filter canister of claim 1, wherein the storm water sewer system includes a catch basin, and further wherein an outer dimension of the retention body approximates a diameter of the catch basin.

4. The filter canister of claim 1, wherein the decontamination material comprises a plurality of peat-based pellets.

5. The filter canister of claim 1, wherein the lower tapered filter is conical.

6. The filter canister of claim 1, wherein the lower tapered filter comprises:
   a rigid frame defining the vertex end and the base of the lower tapered filter; and
   a filter material coupled to the rigid frame.

7. The filter canister of claim 6, wherein the filter material is a metal screen.

8. The filter canister of claim 6, wherein the decontamination material comprises a plurality of adsorbent pellets, and further wherein the filter material defines a pore size smaller than a diameter of each of the plurality of pellets.

9. The filter canister of claim 1, wherein the lower tapered filter is configured to direct contaminants toward an outer periphery of the lower tapered filter.

10. The filter canister of claim 1, further comprising an upper filter associated with the top of the retention body.

11. The filter canister of claim 10, wherein the upper filter is configured to be selectively secured to the top of the retention body.

12. The filter canister of claim 10, wherein the upper filter is conical, defining a vertex end and a base, and further wherein the upper filter is positioned such that the vertex end of the upper filter extends toward the bottom of the retention body.

13. The filter canister of claim 12, wherein the upper filter includes:
   a rigid frame defining the vertex end and the base of the upper filter; and
   a filter material coupled to the rigid frame such that the rigid frame supports the filter material when subjected to a load.

14. The filter canister of claim 13, wherein the filter material is configured to be substantially non-degradable upon exposure to sunlight.

15. The filter canister of claim 13, wherein the upper filter further comprises a handle secured to the rigid frame for facilitating disengagement of the upper filter from the retention body.

16. The filter canister of claim 1, further comprising:
   an intermediate tapered filter secured within the retention body between the top and the bottom, the intermediate conical filter defining a vertex end and a base, and being positioned such that the vertex end of the intermediate tapered filter extends upwardly toward the top of the retention body.

17. The filter canister of claim 16, wherein the lower tapered filter and the intermediate tapered filter each include a filter material, the filter material of the lower tapered filter being different from the filter material of the intermediate tapered filter.

18. The filter canister of claim 16, wherein the decontamination material comprises:
   a first absorbent material disposed between the lower tapered filter and the intermediate tapered filter; and
   a second absorbent material disposed between the intermediate tapered filter and the top of the retention body.

19. The filter canister of claim 1, further comprising:
   a plurality of overflow orifices formed in the retention body adjacent the top.

20. A method of filtering effluent flowing into a storm sewer system, the method including:
   providing a filter canister including a retention body defining a top and a bottom, a lower tapered filter secured to the bottom such that a vertex end of the lower tapered filter extends upwardly toward the top, and a palletized adsorbent media contained within the retention body;
   positioning the filter canister within the storm sewer system such that effluent entering the storm sewer system flows into the top of the retention body;
   directing the effluent through the retention body and into contact with the palletized adsorbent media for removing contaminants from the effluent; and
   guiding the contaminants to an outer periphery of the lower tapered filter such that the contaminants minimally inhibit a flow rate of the effluent through the bottom of the retention body.

21. The method of claim 20, wherein the filter canister further includes an upper tapered filter associated with the top of the retention body such that a vertex end of the upper tapered filter extends downwardly toward the bottom of the retention body, and further wherein directing the effluent through the retention body includes:

directing large contaminants in the effluent toward a center of the upper tapered filter such that the large contaminants minimally inhibit a flow rate of the effluent through the top of the retention body.

22. The method of claim 20, wherein the filter canister includes an intermediate tapered filter secured within the retention body between the lower tapered filter and the top such that a vertex end of the intermediate tapered filter extends toward the top of the retention body, a first adsorbent media supported by the intermediate tapered filter and a second adsorbent media supported by the lower tapered filter, and further wherein directing the effluent through the retention body includes:

removing a first contaminant with the first adsorbent media; and removing a second contaminant with the second adsorbent media.

* * * * *